(No Model.)  2 Sheets—Sheet 1.
C. RUSSELL.
CULTIVATOR.
No. 596,912. Patented Jan. 4, 1898.
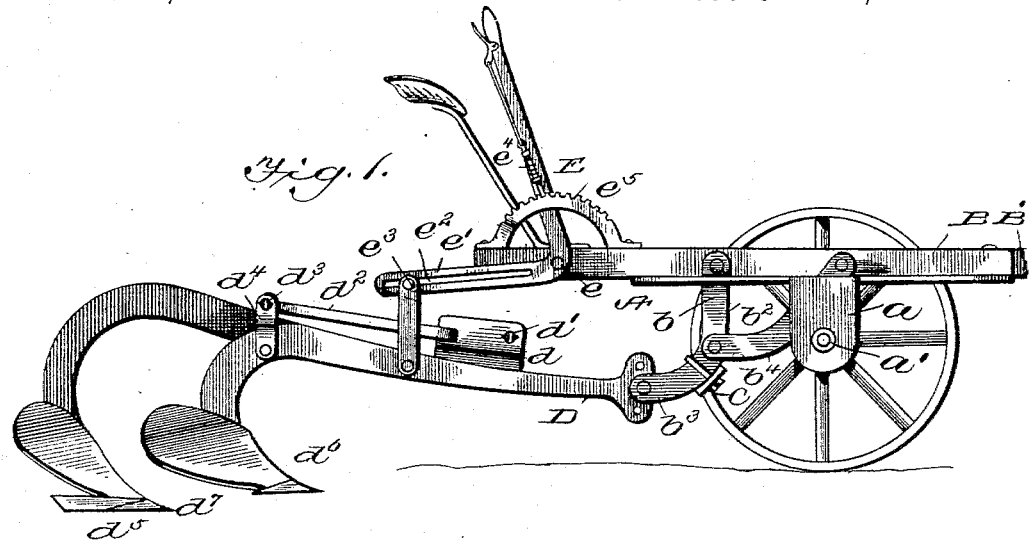
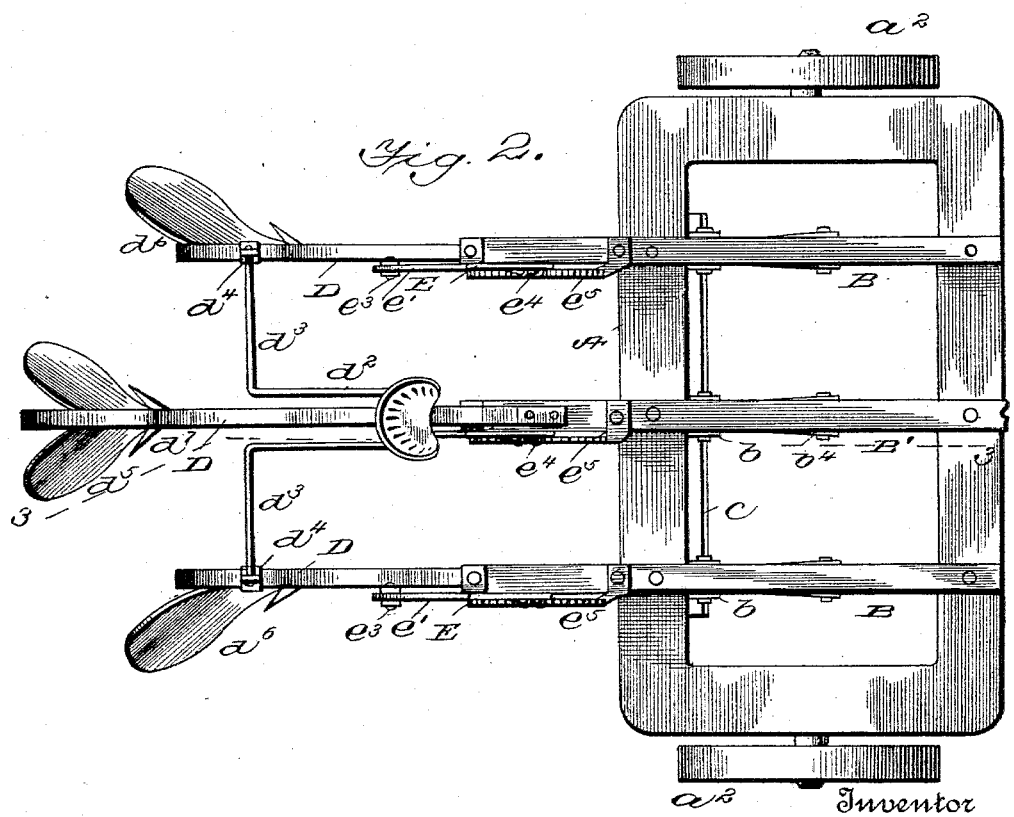
Witnesses
John Imrie
Wm. S. Hodges
Inventor
Cal Russell
by J. Fred Reily,
his Attorney.

(No Model.) 2 Sheets—Sheet 2.

C. RUSSELL.
CULTIVATOR.

No. 596,912. Patented Jan. 4, 1898.

Witnesses

Inventor
Cal Russell
by J. Fred Reily,
his Attorney.

UNITED STATES PATENT OFFICE.

CAL RUSSELL, OF SYLVAN, TEXAS.

CULTIVATOR.

SPECIFICATION forming part of Letters Patent No. 596,912, dated January 4, 1898.

Application filed July 25, 1896. Serial No. 600,503. (No model.)

*To all whom it may concern:*

Be it known that I, CAL RUSSELL, a citizen of the United States, residing at Sylvan, in the county of Lamar and State of Texas, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in cultivators or the like, being designed more particularly for bedding cotton, corn, and all other seed which are planted in beds or rows.

The invention has for its object the production of a cultivator of this character which will be simple in construction, efficient in operation, cheap, and durable.

The invention will be hereinafter fully set forth, and particularly pointed out in the claims.

Figure 3:
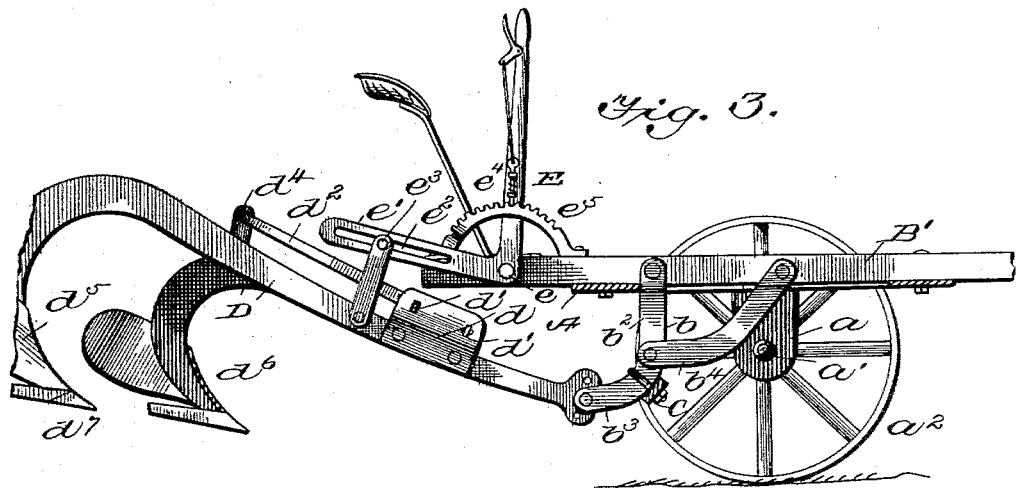
Figure 4:
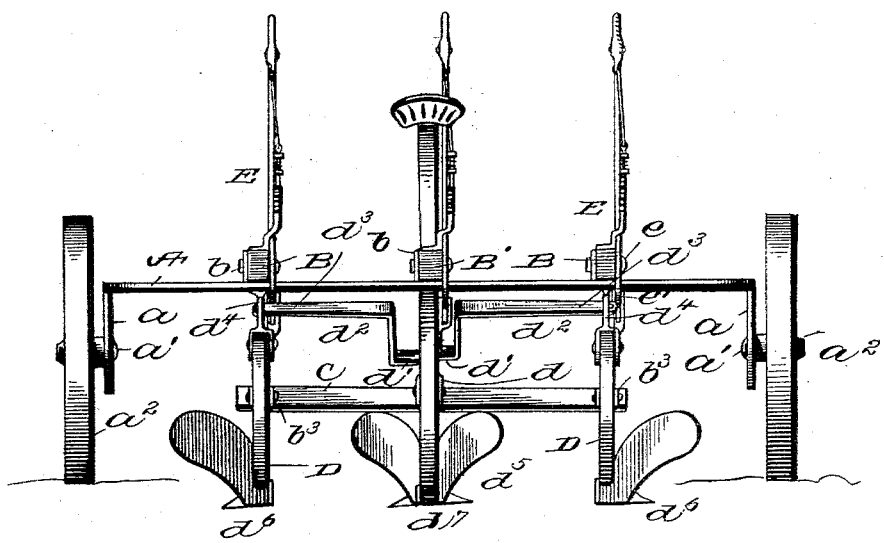
Figure 5:
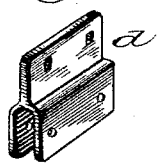

In the accompanying drawings, Figure 1 is a top plan view of my improved cultivator. Fig. 2 is a view in side elevation. Fig. 3 is a longitudinal sectional view on line 3 3, Fig. 2. Fig. 4 is a rear view. Fig. 5 is a detail.

Referring to the drawings, A designates the main frame, which is approximately rectangular in shape and provided with depending standards $a$, in which are mounted the short axles $a'$ of the carrying-wheels $a^2$.

B B' designate a series of beams secured to the top of frame A, the beam B' being longer than the others and adapted to form the tongue for the vehicle, as shown. Each of these beams B B' has secured thereto a depending brace $b$, which consist each of a vertical bar $b^2$, having a lower curved bifurcated end $b^3$ and a strengthening-bar $b^4$, secured at its lower end to bar $b^3$, adjacent the bifurcated portion thereof. The bars $b^3$ are all connected by a brace-plate C. In the bifurcated ends $b^3$ of bars $b^2$ are pivotally secured the forward ends of plow-beams D, which are of any preferred shape. To the central one of these beams D is secured an upwardly-extended plate $d$, in which are pivotally secured the right-angular ends $d'$ of arms $d^2$, said arms at their rear ends being bent or curved outwardly at $d^3$ and pivotally connected to plates $d^4$, secured one to each of the outer plow-beams D. By this means the plows $d^5$ $d^6$ on said beams are kept in a uniform relative position. It will be noted that plow $d^5$ on the central beam D is provided with a double moldboard $d^7$, whereby the same will deflect the soil on each side of the center, while plows $d^6$ are each provided with moldboards on the outside, whereby the soil will be deflected away from the center.

In order to regulate the depth of cut of plows $d^5$ $d^6$, I provide a series of levers E, one for each plow-beam. Each lever E is pivotally mounted at $e$ on one of the beams B B' and is provided with a rearwardly-extended arm or member $e'$, provided with a longitudinal slot $e^2$, in which works a headed pin $e^3$, connected to an arm or bracket extending upwardly from each plow-beam. Said levers are each held in the desired position by means of pawl-levers $e^4$, connected thereto and adapted to engage rack-bars $e^5$, mounted on beams B B' adjacent said levers E.

The advantages and operation of my improved cultivator are at once apparent to those skilled in the art to which it appertains, and it will be specially observed that by means of the connections between the plow-beams and the main frame, the adjusting-levers, and the connections between the plow-beams cotton, corn, or other similar seed can be readily and quickly bedded with but little labor and a great saving of time.

I claim as my invention—

1. A cultivator, comprising a rectangular metal wheel-frame having depending plates forming the axle-bearings, a series of longitudinal beams secured upon said frame to project beyond the rear end thereof, hangers or rearwardly-curved flat bars arranged in pairs secured to opposite sides of the longitudinal beams and bearing against the rear cross-piece of the frame, pivot-pins connecting the lower ends of said bars or hangers, bails embracing each pair of hangers, and a brace-plate connecting all the hangers, the bails passing through the brace-plate to which they are bolted; together with the plow-beams pivoted between the hangers upon said pivot-pins, and means supporting the rear ends of the plow-beams, substantially as shown and described.

2. A cultivator, comprising a rectangular wheel-frame having depending plates forming the axle-bearings, a series of longitudinal beams secured upon said frame to project beyond the rear end thereof, hangers or rearwardly-curved flat bars arranged in pairs secured to opposite sides of the longitudinal beams and bearing against the rear crosspiece of the frame, braces extending from the hangers to said beams, pivot-pins connecting the lower ends of said hangers, bails embracing each pair of hangers, and a brace-plate connecting all the hangers, the bails passing through the brace-plate to which they are bolted; together with the plow-beams pivoted between said hangers upon the pivot-pins, bent bars connecting the plow-beams to prevent excessive spreading, angle-levers pivoted to the rear ends of the longitudinal beams and each having a slotted member connected by a link to its respective plow-beam, and means for holding the levers in an adjusted position, as herein shown and described.

3. A cultivator, comprising a rectangular wheel-frame, a series of longitudinal beams secured upon the frame and projecting beyond the rear end thereof, the center beam being extended forward to provide the tongue, rearwardly-curved bars or hangers arranged in pairs secured to opposite sides of the beams, means as shown for bracing said hangers, plow-beams pivoted at their forward end to the hangers, a casting embracing the center plow-beam and presenting an upwardly-projecting portion, shorter castings on the outer plow-beams, and bent bars connecting the outer plow-beams to the center plow-beam, said bars being attached to the castings; together with levers pivoted to the rear ends of the longitudinal beams, links connecting the levers to the plow-beams, and means for holding the levers in an adjusted position, as shown and described.

In testimony whereof I affix my signature in presence of two witnesses.

CAL RUSSELL.

Witnesses:
E. A. CRAWFORD,
J. M. BOONE.